(12) United States Patent
Baba

(10) Patent No.: US 8,922,917 B2
(45) Date of Patent: Dec. 30, 2014

(54) OPTICAL UNIT AND IMAGE PICKUP APPARATUS

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/988,356

(22) PCT Filed: Nov. 16, 2011

(86) PCT No.: PCT/JP2011/076402
§ 371 (c)(1),
(2), (4) Date: May 20, 2013

(87) PCT Pub. No.: WO2012/070445
PCT Pub. Date: May 31, 2012

(65) Prior Publication Data
US 2013/0242413 A1  Sep. 19, 2013

(30) Foreign Application Priority Data
Nov. 25, 2010 (JP) .................. 2010-262563

(51) Int. Cl.
*G02B 13/00* (2006.01)
*G02B 13/18* (2006.01)
*G02B 13/04* (2006.01)
*G02B 9/12* (2006.01)

(52) U.S. Cl.
CPC .............. *G02B 13/04* (2013.01); *G02B 13/18* (2013.01); *G02B 9/12* (2013.01)
USPC .......................................... 359/784; 359/796

(58) Field of Classification Search
CPC ...... G02B 13/04; G02B 13/18; G02B 13/006; G02B 13/0035; G02B 13/0055; G02B 13/0085
USPC ................................. 359/753, 784, 787, 788
See application file for complete search history.

(56) References Cited

U.S. PATENT DOCUMENTS

| 8,000,037 B2* | 8/2011 | Hirao et al. | 359/784 |
| 8,228,621 B2* | 7/2012 | Fukuta | 359/771 |
| 8,369,028 B2* | 2/2013 | Hirao et al. | 359/741 |

FOREIGN PATENT DOCUMENTS

| EP | 2 654 144 A1 * | 2/2013 |
| JP | 2005-181596 A | 7/2005 |
| JP | 2007-133324 A | 5/2007 |

OTHER PUBLICATIONS

NPL English Translation PCT/ISA/210 prepared for PCT/JP2011/076402 on May 31, 2012.*
NPL English Translation PCT/ISA/237 prepared for PCT/JP2011/076402 on Jun. 6, 2013.*

* cited by examiner

*Primary Examiner* — David N Spector
(74) *Attorney, Agent, or Firm* — Rader, Fishman & Grauer PLLC

(57) ABSTRACT

An optical unit that is configured of a three-group wide-angle lens, that is capable of suppressing optical distortion to a small amount, that has favorable optical characteristics, and that is tolerant of reflow, and an image pickup apparatus are provided. An optical unit 100 includes: a first lens group 110 including a first lens element 111; a second lens group 120 including a second lens element 121, a first transparent member 122, and a third lens element 123 that are arranged in order from object plane toward image plane; and a third lens group 130 including a fourth lens element 131, a second transparent member 132, and a fifth lens element 33 that are arranged in order from the object plane toward the image plane, the first lens group 110, the second lens group 120, and the third lens group 130 being arranged in order from the object plane toward the image plane.

14 Claims, 7 Drawing Sheets

OPTICAL UNIT AND IMAGE PICKUP APPARATUS

TECHNICAL FIELD

The present disclosure relates to an optical unit that is applied to an image pickup unit for applications such as in-vehicle application and monitoring application, and relates to an image pickup apparatus.

BACKGROUND ART

As a prior art of a lens system for applications such as in-vehicle application and monitoring application with a horizontal angle of view of about 90 degrees, a technology of a wide-angle lens disclosed in Patent Literature 1 is known. The wide-angle lens is configured of three groups that include a first lens including a glass lens, and second and third lenses each including an aspheric mold, and is usable for applications such as in-vehicle application and monitoring application.

As another example of such a wide-angle lens including three groups, a technology disclosed in Patent Literature 2 is known.

CITATION LIST

Patent Literature

[Patent Literature 1]: Japanese Unexamined Patent Application Publication No. 2005-181596
[Patent Literature 2]: Japanese Unexamined Patent Application Publication No. 2007-133324

SUMMARY OF THE INVENTION

However, optical distortion is large and even the smallest of three Examples has optical distortion of about 15[%] in the wide-angle lens disclosed in Patent Literature 1. One reason for this is that the first lens has a spherical surface, and therefore, aberration is not sufficiently eliminated.

In the wide-angle lens disclosed in Patent Literature 2, unlike the above-described example, a first lens has an aspheric surface, and therefore, optical distortion is suppressed within 5[%]. However, the first lens is made of plastic. Therefore, a cover glass that protects a front face is necessary in addition when the wide-angle lens is used for applications such as in-vehicle application and monitoring application.

The present disclosure provides an optical unit of a wide-angle lens configured of three groups, that is capable of suppressing optical distortion to a small amount, that has favorable optical characteristics, and that is tolerant of reflow. The present disclosure also provides an image pickup apparatus.

An optical unit of a first example of the present disclosure includes: a first lens group including a first lens element; a second lens group including a second lens element, a first transparent member, and a third lens element that are arranged in recited order from object plane toward image plane; and a third lens group including a fourth lens element, a second transparent member, and a fifth lens element that are arranged in recited order from the object plane toward the image plane, the first, second, and third lens groups being arranged in recited order from the object plane toward the image plane.

An image pickup apparatus of a second embodiment of the present disclosure includes an image pickup device and an optical unit forming an image of a subject in the image pickup device. The optical unit includes: a first lens group including a first lens element; a second lens group including a second lens element, a first transparent member, and a third lens element that are arranged in recited order from object plane toward image plane; and a third lens group including a fourth lens element, a second transparent member, and a fifth lens element that are arranged in recited order from the object plane toward the image plane, the first, second, and third lens groups being arranged in recited order from the object plane toward the image plane.

According to the present disclosure, it is achieved an wide-angle lens including three groups, that is capable of suppressing optical distortion to a small amount, that has favorable optical characteristics, and that is tolerant of reflow.

MODE(S) FOR CARRYING OUT THE INVENTION

Preferred embodiments of the present disclosure will be described below, related to the attached drawings. The description will be given in the following order.

1. First Embodiment (a first configuration example of an image pickup lens adopting an optical unit)
2. Second Embodiment (a second configuration example of an image pickup lens adopting an optical unit)
3. Third Embodiment (a configuration example of an image pickup apparatus)

1. First Embodiment

Figure 1:
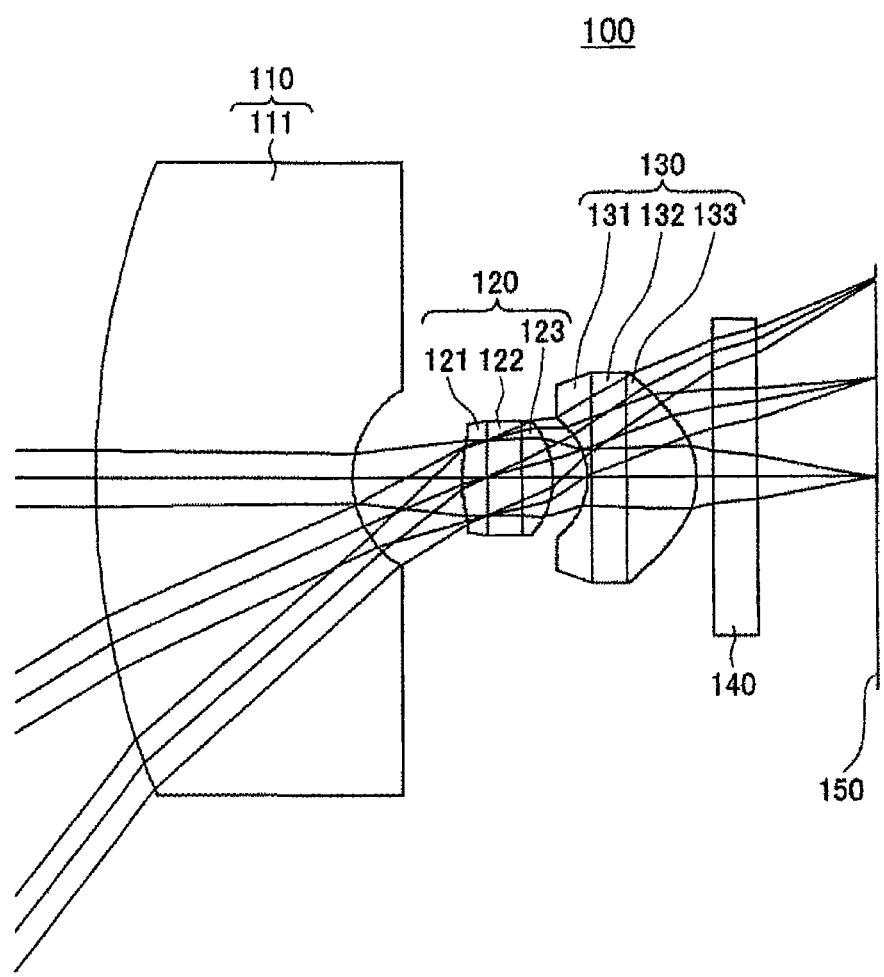
FIG. 1 is a diagram illustrating a configuration example of an image pickup lens according to a first embodiment of the present disclosure.

FIG. 1 is a diagram illustrating a configuration example of an image pickup lens adopting an optical unit according to a first embodiment of the present disclosure.

An image pickup lens 100 of the present first embodiment includes a first lens group 110, a second lens group 120, a third lens group 130, a cover glass 140, and an image plane 150 that are arranged in order from object plane OBJS toward the image plane as shown in FIG. 1. The image pickup lens 100 is formed as a single focus lens. The first lens group 110, the second lens group 120, and the third lens group 130 form an optical unit.

In the first embodiment, the second lens group 120 and the third lens group 130 are each formed of a cemented body that includes a plurality of lens elements arranged with a transparent member in between. The first lens group 110 includes only a single first lens element 111.

The first lens group 110 includes the first lens element 111 that is a glass spherical lens equivalent to BK7 available from SCHOTT AG that has negative power and has a concave shape facing toward the image plane.

The second lens group 120 is formed of a cemented body that includes a second lens element 121, a first transparent member 122, and a third lens element 123 that are arranged in order from the object plane OBJS toward the image plane 150. The third lens group 130 is formed of a cemented body that includes a fourth lens element 131, a second transparent member 132, and a fifth lens element 133 that are arranged in order from the object plane OBJS toward the image plane 150. The second lens group 120 and the third lens group 130 are configured as follows.

In the second lens group 120, the second lens element 121 with an Abbe number of 29.6 that has a plano-convex shape and includes a UV-curable resin as a glass material is attached onto the object plane side of a glass plate equivalent to BK7 available from SCHOTT AG. The third lens element 123 with an Abbe number of 57.1 that has a plano-convex shape and includes a UV-curable resin as a glass material is attached on the opposite side of, i.e., on the image plane side of the second lens group 120. Here, diaphragm is achieved by providing, in advance, a material with almost no transparency such as a chromium film on the object plane side of the glass substrate. Also, an infrared ray (IR) cut filter is provided on the same face.

In the third lens group 130, the fourth lens element 131 with an Abbe number of 29.6 that has a plano-concave shape and includes a UV-curable resin as a glass material is attached onto the object plane side of a glass plate equivalent to BK7 available from SCHOTT AG. The fifth lens element 133 with an Abbe number of 57.1 that has a plano-convex shape and includes a UV-curable resin as a glass material is attached onto the image plane side of the third lens group 130.

For the second lens group 120 and the third lens group 130, a process of fabricating a number of lenses on the wafer-like glass substrate at the same time with use of a UV-curable resin is preferable. This process is performed for the second lens element 121, the third lens element 123, the fourth lens element 131, and the fifth lens element 133. Thus, the lenses are manufactured efficiently. Subsequently, it is preferable that the glass wafers of the second lens group 120 and of the third lens group 130 be attached to each other and be subjected to dicing to be separated into pieces. It is preferable that second lens group 120, the third lens group 130, and the first lens element 111 in the first lens group 110 that are formed in the foregoing manner be assembled in a lens barrel.

In the present first embodiment, the first lens group 110, the second lens group 120, and the third lens group 130 are specifically configured as follows. The first lens group 110 includes a lens with strong negative power with a focal length of −2.92 [mm]. The advantages thereof are that this suppresses degradation in amount of peripheral light and that this allows an entrance pupil position to move toward the object plane. When the entrance pupil position is moved toward the object plane, a function of suppressing an incident angle of main light rays of peripheral light incident on the image pickup device to a small amount is obtained, and an advantage that back focus becomes long is obtained. Therefore, characteristics favorable for a digital camera are obtained. The second lens group 120 has a strong positive power with a combined focal length of 1.38 [mm]. This corrects optical distortion, asymmetric aberration, etc. resulting from the strong negative power of the first lens group 110. The third lens group 130 has a negative power and a small Abbe number on the incident side thereof, and has positive power and a large Abbe number on the emission side thereof. The third lens group 130 corrects various aberrations such as chromatic aberration well. Accordingly, a high-definition lens in which optical distortion is suppressed to −5.7[%] with a horizontal angle of view of 90 degrees is achieved.

In the image pickup lens 100 which is a single-focus lens, it is assumed that an image pickup plane (image receiving plane) of a solid image pickup device such as a CCD (charge coupled device) sensor and a CMOS (complementary metal oxide semiconductor) sensor is arranged at the image plane 150. The cover glass 140 formed of a resin or glass is arranged between the image-plane-sided face of the fifth lens element 133 and the image plane 150. Further, an IR cut filter, a low-pass filter, etc. and an optical member other than those may be provided between the image-plane-sided face of the fifth lens element 133 and the image plane 150. It is to be noted that the left side of FIG. 1 is closer to the object plane (front) and the right side of FIG. 1 is closer to the image plane (back) in the present embodiment. The optical flux incident from the object plane forms an image on the image plane 150.

Description will be given below of a configuration and functions of the image pickup lens that is a wide-angle lens of the present embodiment. The image pickup lens 100 of the present embodiment that is a single-focus lens is so configured as to satisfy the following Conditional Expressions (1) to (5).

Conditional Expression (1) relates to a focal length fL1 of the first lens group 110.

$$-10 \leq fL1/f \leq -0.2 \tag{1}$$

Here, f is a focal length of whole of the optical system (lens system).

In a case of a wide-angle lens, an amount of peripheral light is typically degraded by the fourth power rule of cosine. Further, in a case of a subject-type lens beginning with positive power, back focus becomes extremely short, which causes difficulty in mounting. Moreover, an angle of light rays incident on the image pickup device becomes extremely large. Therefore, the symmetrical lens beginning with positive power is hardly used in digital cameras that use sensors such as CCD sensors and CMOS sensors. A wide-angle lens beginning with a negative group is typically used. Advantages thereof are that degradation in amount of peripheral light is suppressed and that an entrance pupil position is allowed to be moved toward the object plane. When the entrance pupil position is moved toward the object plane, a function of suppressing an incident angle of main light rays of peripheral light incident on the image pickup device to a small amount is obtained, and an advantage that back focus becomes long is obtained. Therefore, characteristics favorable for a digital camera are obtained.

Conditional Expression (1) is necessary for the above-described reasons. When the value of fL1/f is smaller than the lower limit, negative power becomes small, and therefore, the above-described advantages are not obtained. Therefore, this lower limit is necessary. When the value of fL1/f is larger than the upper limit, negative power becomes strong, and therefore, power of subsequent groups that correct the negative power becomes strong. As a result, manufacturing tolerance becomes extremely small and practical manufacturing may not be possible. Therefore, this upper limit is set.

Conditional Expression (2) relates to a focal length fL2 of the second lens group 120.

$$0.8 \leq fL2/f \leq 5 \quad (2)$$

Here, f is the focal length of whole of the optical system (lens system).

When a lens with strong negative power is brought to the first lens group 110, the foregoing advantages are obtained as described above. However, this causes optical distortion, asymmetric aberration, etc. It is preferable to allow the second lens group 120 to have positive power so as to correct the optical distortion, the asymmetric aberration, etc. Conditional Expression (2) is necessary for the above-described reason. When the value of fL2/f is smaller than the lower limit, positive power becomes strong. As a result, manufacturing tolerance becomes extremely small and practical manufacturing may not be possible. Therefore, this lower limit is set. When the value of fL2/f is larger than the upper limit, optical distortion, asymmetrical aberration, etc. are not corrected. Therefore, favorable camera characteristics are not obtainable. Therefore, this upper limit is necessary. The first lens group 110 and the second lens group 120 each have a role to eliminate the above-described various aberrations. Therefore, the third lens group 130 preferably has a configuration in which chromatic aberration is eliminated basically.

Conditional Expression (3) relates to an Abbe number vdE4 of the fourth lens element 131 in the third lens group 130.

$$24 \leq vdE4 \leq 45 \quad (3)$$

Conditional Expression (3) is necessary for the following reasons. The fourth lens element 131 in the third lens group 130 has negative power. Therefore, a smaller Abbe number is the achromatic condition. The lower limit is defined based on a property value. At present, a glass material with an Abbe number of 24 or smaller has not been reported and the practical value at most is the present lower limit. When the Abbe number vdE4 is larger than the upper limit, achromaticity is not achieved and chromatic aberration occurs, which leads to degradation in camera characteristics. Therefore, the present upper limit is set.

Conditional Expression (4) relates to an Abbe number vdE5 of the fifth lens element 133 in the third lens group 130.

$$42 \leq vdE5 \leq 66 \quad (4)$$

Conditional Expression (4) is necessary for the following reasons. The fifth lens element 133 in the third lens group 130 has positive power. Therefore, a larger Abbe number is the achromatic condition. When the Abbe number vdE5 is smaller than the lower limit, achromaticity is not achieved and chromatic aberration occurs, which leads to degradation in camera characteristics. Therefore, the present lower limit is set. The upper limit is defined based on a property value. At present, a glass material with an Abbe number of 66 or larger has not been reported and a value that is practical at most is the present upper limit.

Conditional Expression (5) relates to an angle of view.

$$65 \leq 2\omega \leq 140 \text{ unit:}[°] \quad (5)$$

ω is a horizontal half angle of view.

Conditional Expression (5) is necessary for the following reasons. When the value of 2ω is lower than the lower limit, the angle of view becomes close to the normal angle of view even in the wide-angle lens, and therefore, a lens beginning with a negative group is not optimal. Therefore, the present lower limit is set. Further, it is extremely difficult to obtain the characteristics in the three-group configuration with a horizontal angle of view of 140 or larger.

The above-described Conditional Expressions (1) to (5) are common to Examples 1 and 2 described below, and will be appropriately adopted as necessary, thereby achieving a compact optical system with a further favorable imaging performance that is suitable for each image pickup device or each image pickup apparatus.

It is to be noted that the shape of the aspheric surface of the lens is expressed by the following expression where: a direction from the object plane toward the image plane is a positive direction; k is a conical coefficient; A, B, C, and D are aspheric surface coefficients; and r is a center curvature radius. y is a height of the light rays from the optical axis and c is a reciprocal (1/r) of the center curvature radius r. It is to be noted that X is a distance from a tangent plane with respect to a vertex of the aspheric surface, A is a fourth-degree aspheric surface coefficient, B is a sixth-degree aspheric surface coefficient, C is an eighth-degree aspheric surface coefficient, and D is a tenth-degree aspheric surface coefficient.

Aspheric Surface Equation $$X = \frac{cy^2}{1 + \sqrt{1 - (1+k)c^2 y^2}} + Ay^4 + By^6 + Cy^8 + Dy^{10}$$

Figure 2:
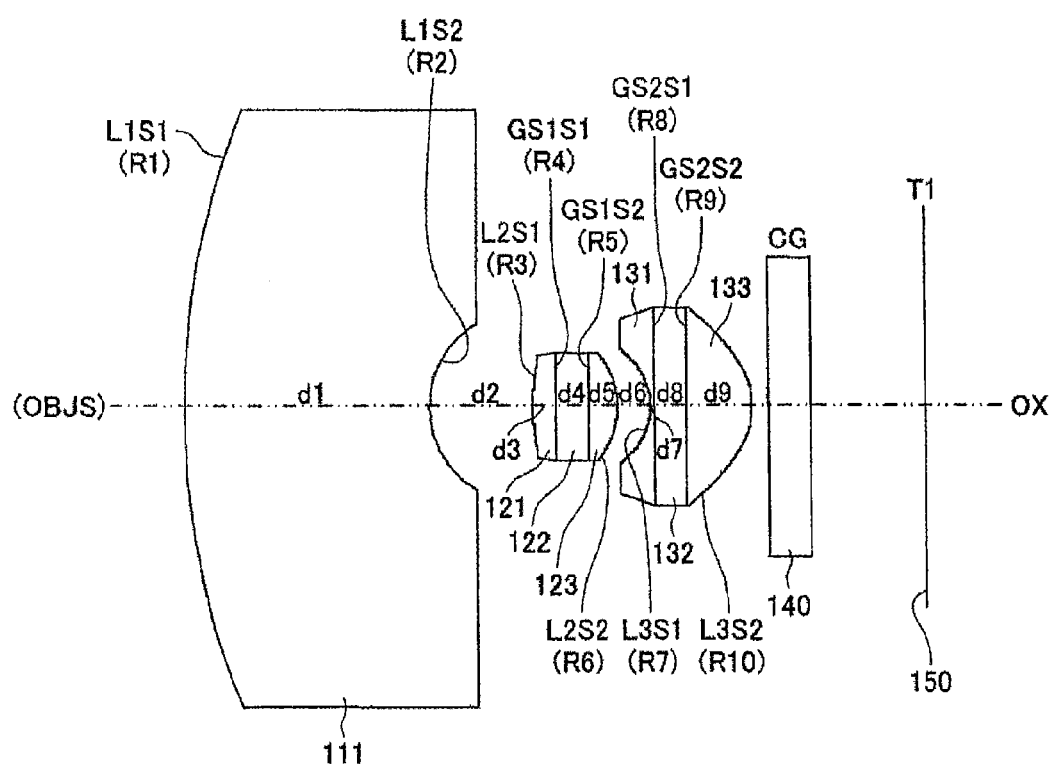
FIG. 2 is a diagram illustrating surface numbers assigned to lenses configuring respective lens groups, substrates, and a cover glass configuring an image pickup section, in the image pickup lens according to the first embodiment.

FIG. 2 is a diagram showing surface numbers assigned to lenses configuring respective lens groups, substrates (transparent members), a cover glass configuring an image pickup section, and an image plane in the image pickup lens according to the present first embodiment.

Specifically, a surface number L1S1 is assigned to an object-sided face (convex face) of the first lens element 111 in the first lens group 110, and a surface number L1S2 is assigned to an image-plane-sided face of the first lens element 111. A surface number L2S1 is assigned to an object-sided face of the second lens element 121 in the second lens group 120, and a surface number GS1S1 is assigned to an interface (cemented face) of the second lens element 121 and an object-sided face of the first transparent member 122. A surface number GS1S2 is assigned to an interface (cemented face) of the image-plane-sided face of the first transparent member 122 and an object-sided face of the third lens element 123, and a surface number L2S2 is assigned to an image-plane-sided face of the third lens element 123. A surface number L3S1 is assigned to an object-sided face of the fourth lens element 131 in the third lens group 130, and a surface number GS2S1 is assigned to an interface (cemented face) of the fourth lens element 131 and the object-sided face of the second transparent member 132. A surface number GS2S2 is assigned to an interface (cemented face) of the image-plane-sided face of the second transparent member 132 and an object-sided face of the fifth lens element 133, and a surface number L3S2 is assigned to an image-plane-sided face of the fifth lens element 133. A surface number CG is assigned to the cover glass 140 and a surface number T1 is assigned to the image plane 150.

Moreover, as shown in FIG. 2, a center curvature radius of the object-sided face L1S1 of the first lens element 111 in the first lens group 110 is set as R1 in the image pickup lens 100 of the present embodiment. A center curvature radius of the image-plane-sided face L1S2 of the first lens element 111 is set as R2. A center curvature radius of the object-sided face L2S1 of the second lens element 121 in the second lens group 120 is set as R3, and a center curvature radius of the interface (cemented face) GS1S1 of the image-plane-sided face of the second lens element 121 and the object-sided face of the first transparent member 122 is set as R4. A center curvature radius of the interface (cemented face) GS1S1 of the image-plane-sided face of the first transparent member 122 and the object-sided face of the third lens element 123 is set as R5. A center curvature radius of the image-plane-sided face L2S2 of the third lens element 123 is set as R6. A center curvature radius of the object-sided face L3S1 of the fourth lens element 131 in the third lens group 130 is set as R7, and a center curvature radius of the interface (cemented face) GS2S1 of the image-plane-sided face of the fourth lens element 131 and the object-sided face of the third transparent member 132 is set as R8. A center curvature radius of the interface (cemented face) GS2S2 of the image-plane-sided face of the second transparent member 132 and the object-sided face of the fifth lens element 133 is set as R9. A center curvature radius of the image-plane-sided face L3 S2 of the fifth lens element 133 is set as R10. It is to be noted that the center curvature radiuses R4, R5, R8, and R9 of the faces GS1S1, GS1S2, GS2S1, and GS2S2, respectively, are infinity.

Moreover, as shown in FIG. 2, a distance on an optical axis OX between the face L1S1 and the face L1S2 that is a thickness of the first lens element 111 in the first lens group 110 is set as d1. A distance on the optical axis OX between the image-plane-sided face L1S2 of the first lens element 111 and the object-sided face L2S1 of the second lens element 121 in the second lens group 120 is set as d2. A distance on the optical axis OX between the face L2S1 and the face GS1S1 that is a thickness of the second lens element 121 is set as d3. A distance on the optical axis OX between the face GS1S1 and the face GS1S2 that is a thickness of the first transparent member 122 is set as d4. A distance on the optical axis OX between the face GS1S2 and the face L2S2 that is the thickness of the third lens element 123 is set as d5. A distance on the optical axis between the image-plane-sided face L2S2 of the third lens element 123 and the object-sided face L3S1 of the fourth lens element 131 in the third lens group 130 is set as d6. A distance on the optical axis OX between the face L3S1 and the face GS2S1 that is a thickness of the fourth lens element 131 is set as d7. A distance on the optical axis OX between the face GS2S1 and the face GS2S2 that is a thickness of the second transparent member 132 is set as d8. A distance on the optical axis OX between the face GS2S2 and the face L3S2 that is a thickness of the fifth lens element 133 is set as d9.

Example 1 with specific numeral values of the image pickup lens will be described below. It is to be noted that, in Example 1, surface numbers as shown in FIG. 2 are assigned to the respective lens elements and the glass substrates (transparent members) in the image pickup lens 100.

Example 1

Table 1, Table 2, Table 3, and Table 4 show respective numeral values of Example 1. The respective numeral values of Example 1 correspond to the image pickup lens 100 in FIG. 1. Example 1 is a design example for a ¼-sized CCD or CMOS imager.

Table 1 shows a curvature radius (R: mm), a space (d: mm), a refractive index (nd), and a dispersion value (vd) of each of the lens elements, the glass substrates (transparent members), etc. corresponding to the respective surface numbers of the image pickup lens in Example 1.

TABLE 1

Lens Configuration Data of Example 1

| Surface number | R | d | nd | vd |
|---|---|---|---|---|
| L1S1: | 9.465 | 3.000 | 1.52 | 64.2 |
| L1S2: | 1.165 | 1.264 | | |
| L2S1: | 2.150 | 0.278 | 1.59 | 29.6 |
| GS1S1: | INFINITY | 0.400 | 1.52 | 64.2 |
| GS1S2: | INFINITY | 0.362 | 1.51 | 57.3 |
| L2S2: | −0.926 | 0.402 | | |
| L3S1: | −0.756 | 0.050 | 1.59 | 29.6 |
| GS2S1: | INFINITY | 0.400 | 1.52 | 64.2 |
| GS2S2: | INFINITY | 0.804 | 1.51 | 57.3 |
| L3S2: | −0.911 | 0.200 | | |
| CG: | INFINITY | 0.500 | 1.52 | 64.2 |
| T1: | INFINITY | 1.406 | | |

Table 2 shows fourth-degree, sixth-degree, eighth-degree, and tenth-degree aspheric surface coefficients of the face L2S1 of the second lens element 121, of the face L2S2 of the third lens element 123, of the face L3S1 of the fourth lens element 131, and of the face L3S2 of the fifth lens element 133 that each include an aspheric surface in Example 1. In Table 2, K, A, B, C, and D are a conical constant, a fourth-degree aspheric surface coefficient, a sixth-degree aspheric surface coefficient, an eighth-degree aspheric surface coefficient, and a tenth-degree aspheric surface coefficient, respectively.

TABLE 2

Aspheric Surface Data of Example 1

| Face | K: | A: | B: | C: | D: |
|---|---|---|---|---|---|
| L2S1 | −0.953 | −0.633E−01 | −0.291E+00 | 0.315E+00 | −0.151E+01 |
| Face | K: | A: | B: | C: | D: |
| L2S2 | −0.689 | −0.894E−02 | −0.160E+00 | 0.199E+00 | −0.740E+00 |
| Face | K: | A: | B: | C: | D: |
| L3S1 | −0.265 | −0.361E−01 | 0.309E+00 | −0.336E+00 | 0.364E+00 |
| Face | K: | A: | B: | C: | D: |
| L3S2 | −0.822 | 0.103E−01 | 0.109E−01 | −0.146E−01 | 0.174E−01 |

Table 3 specifically shows a focal length f, an aperture number F, a half angle of view ω, and a lens length H of the image pickup lens 100 in Example 1. Here, the focal length f is set to 1.85 [mm], the aperture number F is set to 2.8, the half angle of view ω is set to 52.5 deg, and the lens length H is set to 9.07 [mm].

TABLE 3

Configuration Data of Example 1 f (focal length) = 1.85 mm
F (aperture number) = 2.8
ω (half angle of view) = 52.5 deg
H (whole length of lens) = 9.07 mm Table 4 shows that each of the above-described Conditional Expressions (1) to (5) is satisfied in Example 1.

TABLE 4

Values of Conditional Expression for Each Example

| Conditional Expression | Example 1 |
|---|---|
| (1) | −1.58 |
| (2) | 0.74 |

TABLE 4-continued

Values of Conditional Expression for Each Example

| Conditional Expression | Example 1 |
|---|---|
| (3) | 29.6 |
| (4) | 57.1 |
| (5) | 90 |

As shown in Table 4, in Example 1, the value (fL1/f) related to the focal length of the first lens group 110 is set to −1.58, which satisfies the condition defined by Conditional Expression (1). The value (fL2/f) related to the focal length of the first lens group 110 is set to 0.74, which satisfies the condition defined by Conditional Expression (2). The Abbe number vdE4 of the fourth lens element 131 in the third lens group 130 is set to 29.6, which satisfies the condition defined by Conditional Expression (3). The Abbe number vdE5 of the fifth lens element 133 in the third lens group 130 is set to 57.1, which satisfies the condition defined by Conditional Expression (4). The angle of view 2ω is set to 90, which satisfies the condition defined by Conditional Expression (5).

Figure 3:
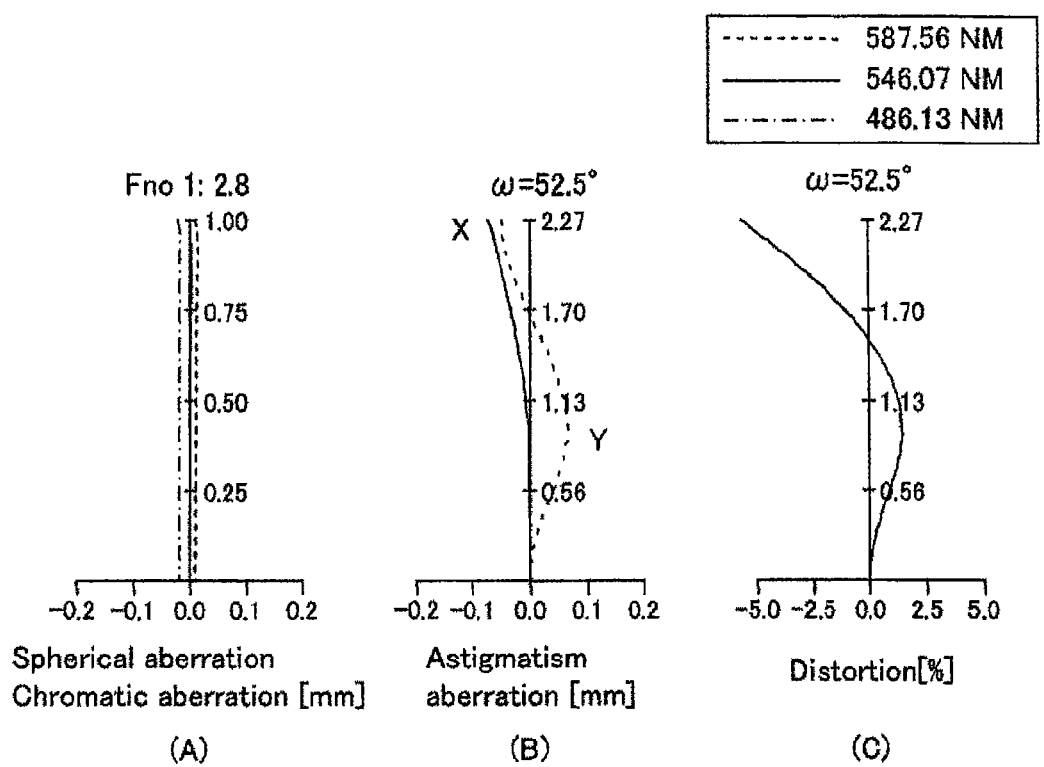
FIG. 3 is an aberration diagram illustrating spherical aberration, astigmatism aberration, and distortion in Example 1.

FIG. 3 is an aberration diagram illustrating spherical aberration (chromatic aberration), astigmatism aberration, and distortion in Example 1. Parts (A), (B), and (C) of FIG. 3 show spherical aberration (chromatic aberration), astigmatism aberration, and distortion, respectively. As can be seen from FIG. 3, according to Example 1, spherical aberration, astigmatism aberration, and distortion are favorably corrected, and therefore, an image pickup lens including an optical unit with superior imaging performance is obtained.

2. Second Embodiment

Figure 4:
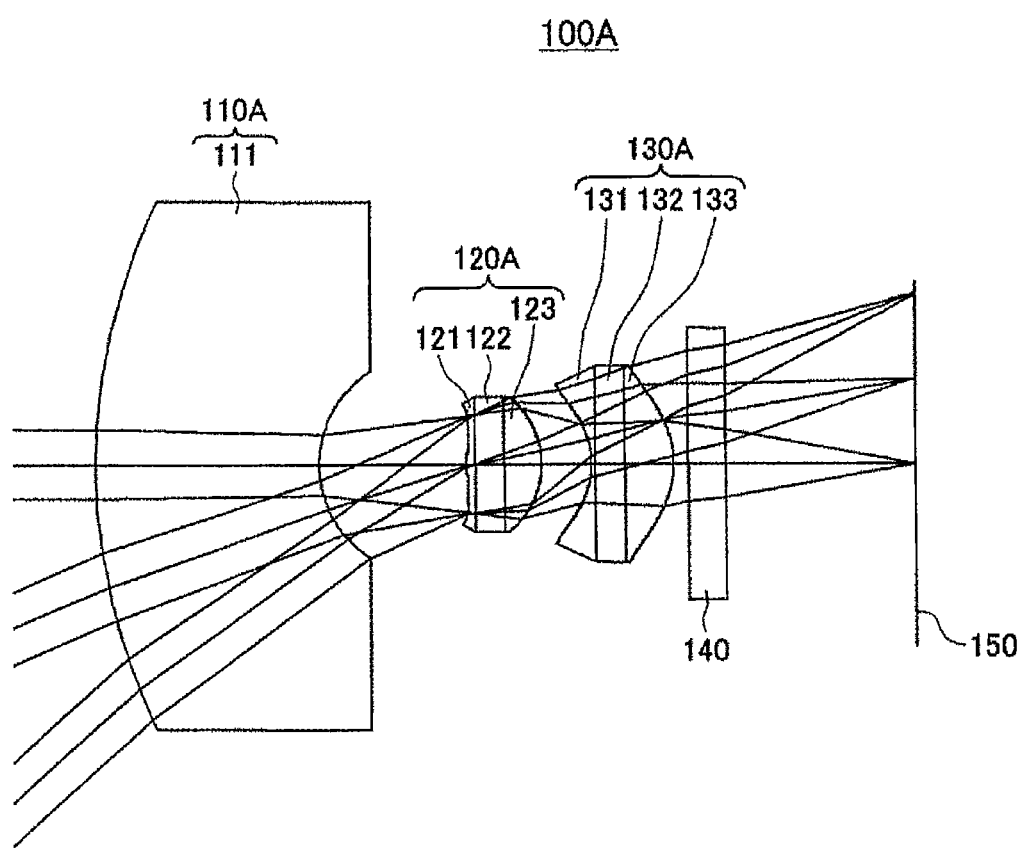
FIG. 4 is a diagram illustrating a configuration example of an image pickup lens according to a second embodiment of the present disclosure.

FIG. 4 is a diagram illustrating a configuration example of an image pickup lens according to a second embodiment of the present disclosure.

An image pickup lens 100A according to the second embodiment shown in FIG. 4 basically includes three groups, that is, a first lens group 110A, a second lens group 120A, and a third lens group 130A, as in the first embodiment. The second lens group 120A and the third lens group 130A are each formed of a cemented body that includes a plurality of lens elements arranged with a transparent member in between also in the second embodiment. The first lens group 110A includes only the single first lens element 111.

The first lens group 110A includes the first lens element 111 that is a glass spherical lens equivalent to BK7 available from SCHOTT AG that has negative power and has a concave shape facing toward the image plane.

The second lens group 120A is formed of a cemented body that includes the second lens element 121, the first transparent member 122, and the third lens element 123 that are arranged in order from the object plane OBJS toward the image plane 150. The third lens group 130A is formed of a cemented body that includes the fourth lens element 131, the second transparent member 132, and the fifth lens element 133 that are arranged in order from the object plane OBJS toward the image plane 150. The second lens group 120A and the third lens group 130A are configured as follows.

In the second lens group 120A, the second lens element 121 with an Abbe number of 29.6 that has a plano-convex shape and includes a UV-curable resin as a glass material is attached onto the object plane side of a glass plate equivalent to BK7 available from SCHOTT AG. The third lens element 123 with an Abbe number of 57.1 that has a plano-convex shape and includes a UV-curable resin as a glass material is attached onto the opposite image plane side of the second lens group 120A. Here, diaphragm is achieved by providing, in advance, a material with almost no transparency such as a chromium film on the object plane side of the glass substrate. Also, an infrared ray (IR) cut filter is provided on the same face.

In the third lens group 130A, the fourth lens element 131 with an Abbe number of 29.6 that has a plano-concave shape and includes a UV-curable resin as a glass material is attached onto the object plane side of a glass plate equivalent to BK7 available from SCHOTT AG. The fifth lens element 133 with an Abbe number of 57.1 that has a plano-convex shape and includes a UV-curable resin as a glass material is attached onto the image plane side of the third lens group 130A.

For the second lens group 120A and the third lens group 130A, a process of fabricating a number of lenses on the wafer-like glass substrate at the same time with use of a UV-curable resin is preferable. This process is performed for the second lens element 121, the third lens element 123, the fourth lens element 131, and the fifth lens element 133. Thus, the lenses are manufactured efficiently. Subsequently, it is preferable that the glass wafers of the second lens group 120A and of the third lens group 130A be attached to each other and be subjected to dicing to be separated into pieces. It is preferable that second lens group 120A, the third lens group 130A, and the first lens element 111 in the first lens group 110 that are formed in the foregoing manner be assembled in a lens barrel.

In the present second embodiment, the first lens group 110A, the second lens group 120A, and the third lens group 130A are specifically configured as follows. The first lens group 110A includes a lens with strong negative power with a focal length of −4.08 [mm]. The advantages thereof are that this suppresses degradation in amount of peripheral light and that this allows an entrance pupil position to move toward the object plane. When the entrance pupil position is moved toward the object plane, a function of suppressing an incident angle of main light rays of peripheral light incident on the image pickup device to a small amount is obtained, and an advantage that back focus becomes long is obtained. Therefore, characteristics favorable for a digital camera are obtained. The second lens group 120A has a strong positive power with a combined focal length of 1.96 [mm]. This corrects optical distortion, asymmetric aberration, etc. resulting from the strong negative power of the first lens group 110A. The third lens group 130A has a negative power and a small Abbe number on the incident side thereof, and has positive power and a large Abbe number on the emission side thereof. The third lens group 130 corrects various aberrations such as chromatic aberration well. Accordingly, a high-definition lens in which optical distortion is suppressed to −6.2[%] with a horizontal angle of view of 70 degrees is achieved.

Figure 5:
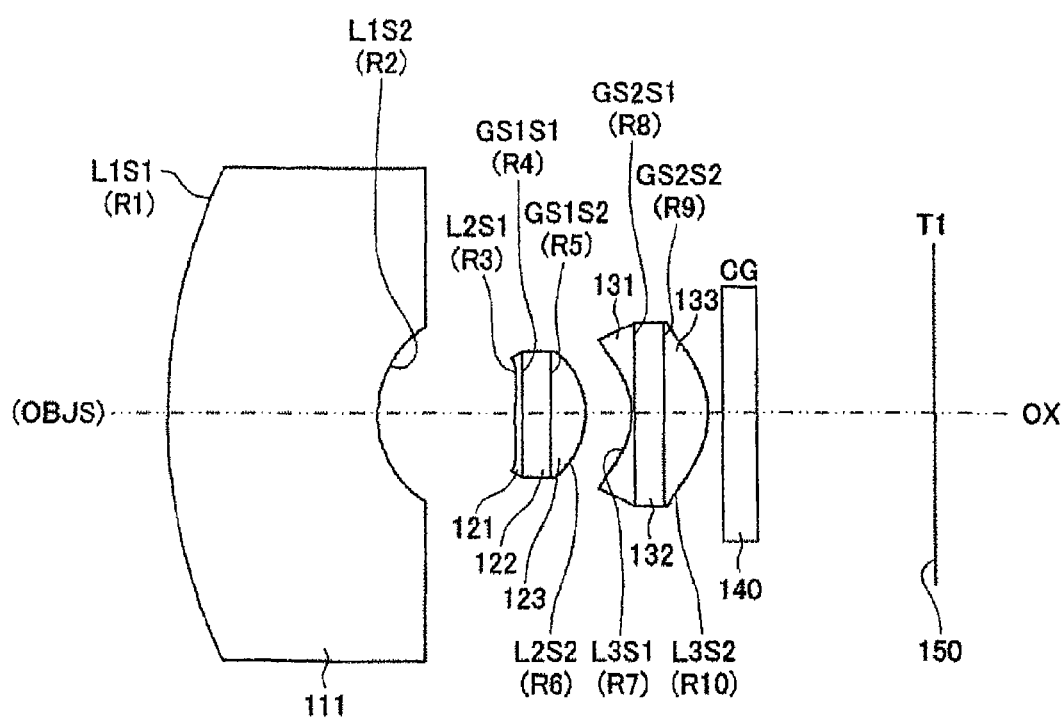
FIG. 5 is a diagram illustrating surface numbers assigned to lenses configuring respective lens groups, substrates, and a cover glass configuring an image pickup section, in the image pickup lens according to the second embodiment.

Example 2 with specific numeral values of the image pickup lens will be described below. It is to be noted that, in Example 2, surface numbers similar to those in FIG. 2 are assigned to the respective lens elements, the glass substrates (transparent members), the cover glass 140 configuring an image pickup section, and the image pickup plane 150 in the image pickup lens 100A, as shown in FIG. 5.

Example 2

Table 5, Table 6, Table 7, and Table 8 show respective numeral values of Example 2. The respective numeral values of Example 2 correspond to the image pickup lens 100A in FIG. 4. Example 2 is a design example for a ¼-sized CCD or CMOS imager.

Table 5 shows a curvature radius (R: mm), a space (d: mm), a refractive index (nd), and a dispersion value (vd) of each of the lens elements, the glass substrates (transparent members), etc. corresponding to the respective surface numbers of the image pickup lens in Example 2.

TABLE 5

Lens Configuration Data of Example 2

| Surface number | R | d | nd | vd |
|---|---|---|---|---|
| L1S1: | 7.953 | 3.000 | 1.52 | 64.2 |
| L1S2: | 1.456 | 1.993 | | |
| L2S1: | 6.240 | 0.108 | 1.59 | 29.6 |
| GS1S1: | INFINITY | 0.400 | 1.52 | 64.2 |
| GS1S2: | INFINITY | 0.500 | 1.51 | 57.3 |
| L2S2: | −1.160 | 0.674 | | |
| L3S1: | −1.067 | 0.050 | 1.59 | 29.6 |
| GS2S1: | INFINITY | 0.400 | 1.52 | 64.2 |
| GS2S2: | INFINITY | 0.841 | 1.51 | 57.3 |
| L3S2: | −1.279 | 0.200 | | |
| CG: | INFINITY | 0.500 | 1.52 | 64.2 |
| T1: | INFINITY | 2.575 | | |

Table 6 shows fourth-degree, sixth-degree, eighth-degree, and tenth-degree aspheric surface coefficients of the face L2S1 of the second lens element 121, of the face L2S2 of the third lens element 123, of the face L3S1 of the fourth lens element 131, and of the face L3S2 of the fifth lens element 133 that each include an aspheric surface in Example 2. In Table 6, K, A, B, C, and D are a conical constant, a fourth-degree aspheric surface coefficient, a sixth-degree aspheric surface coefficient, an eighth-degree aspheric surface coefficient, and a tenth-degree aspheric surface coefficient, respectively.

TABLE 6

Aspheric Surface Data of Example 2

| Face | K | A: | B: | C: | D: |
|---|---|---|---|---|---|
| L2S1 | : −1.000 | −0.834E−01 | −0.257E+00 | 0.508E+00 | −0.887E+00 |
| Face | K: | A: | B: | C: | D: |
| L2S2 | −0.559 | −0.337E−01 | −0.887E−01 | 0.937E−01 | −0.121E+00 |
| Face | K: | A: | B: | C: | D: |
| L3S1 | −0.568 | −0.103E−01 | 0.268E−01 | 0.658E−01 | −0.793E−02 |
| Face | K: | A: | B: | C: | D: |
| L3S2 | −0.702 | 0.937E−02 | 0.502E−02 | 0.548E−02 | 0.257E−02 |

Table 7 specifically shows a focal length f, an aperture number F, a half angle of view ω, and a lens length H of the image pickup lens 100 in Example 2. Here, the focal length f is set to 2.69 [mm], the aperture number F is set to 2.8, the half angle of view ω is set to 42.0 deg, and the lens length H is set to 11.0 [mm].

TABLE 7

Configuration Data of Example 2 f (focal length) = 2.69 mm
F (aperture number) = 2.8
ω (half angle of view) = 42.0 deg
H (whole length of lens) = 11.0 mm Table 8 shows that each of the above-described Conditional Expressions (1) to (5) is satisfied in Example 2.

TABLE 8

Value of Conditional Expression for Each Example

| Conditional Expression | Example 2 |
|---|---|
| (1) | −1.52 |
| (2) | 0.72 |
| (3) | 29.6 |
| (4) | 57.1 |
| (5) | 70 |

As shown in Table 8, in Example 2, the value (fL1/f) related to the focal length of the first lens group 110 is set to −1.52, which satisfies the condition defined by Conditional Expression (1). The value (fL2/f) related to the focal length of the first lens group 110 is set to 0.72, which satisfies the condition defined by Conditional Expression (2). The Abbe number vdE4 of the fourth lens element 131 in the third lens group 130 is set to 29.6, which satisfies the condition defined by Conditional Expression (3). The Abbe number vdE5 of the fifth lens element 133 in the third lens group 130 is set to 57.1, which satisfies the condition defined by Conditional Expression (4). The angle of view 2ω is set to 70, which satisfies the condition defined by Conditional Expression (5).

Figure 6:
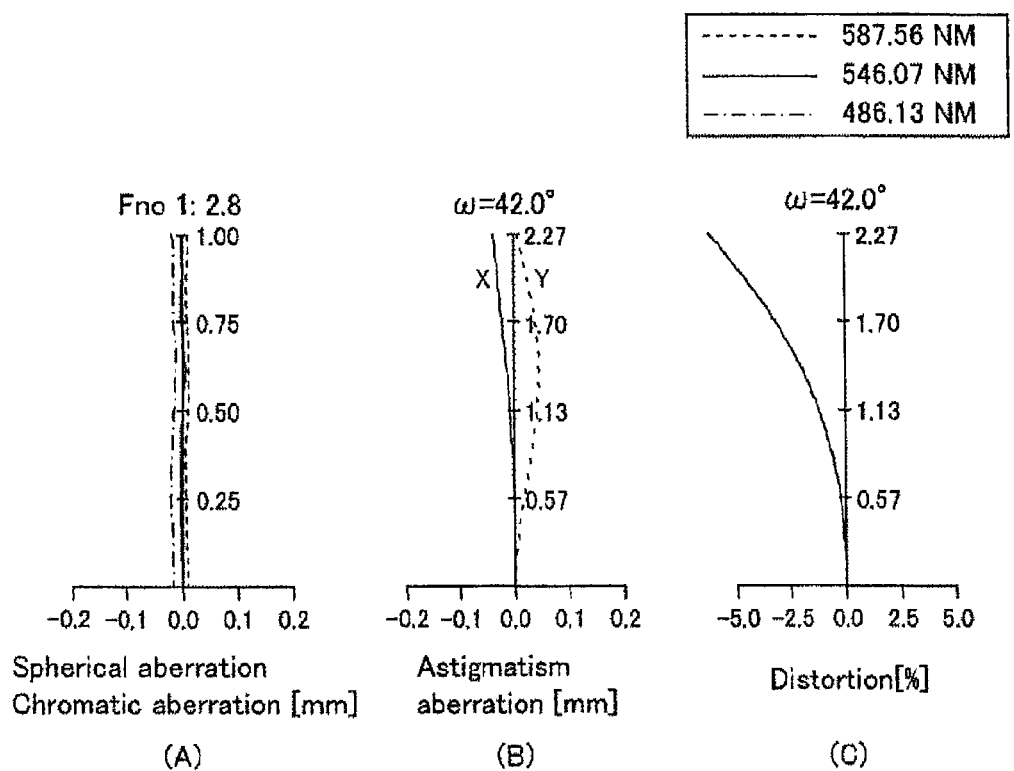
FIG. 6 is an aberration diagram illustrating spherical aberration, astigmatism aberration, and distortion in Example 2.

FIG. 6 is an aberration diagram illustrating spherical aberration (chromatic aberration), astigmatism aberration, and distortion in Example 2. Parts (A), (B), and (C) of FIG. 6 show spherical aberration (chromatic aberration), astigmatism aberration, and distortion, respectively. As can be seen from FIG. 6, according to Example 2, spherical aberration, astigmatism aberration, and distortion are favorably corrected, and therefore, an image pickup lens including an optical unit with superior imaging performance is obtained.

According to the present embodiments described above, the following effects are obtained. A compact wide-angle lens optimal for sensors such as CCD sensors and CMOS sensors is achieved. The lens is optimal for applications such as in-vehicle application and monitoring application since the first lens group has a glass spherical surface. Moreover, a reflowable glass material is allowed to be used. Therefore, high thermal resistance and high durability are achieved. Optical distortion is suppressed to about 6[%], and therefore, a lens with favorable optical characteristics is achieved. The second lens group and the third lens group in the three-group configuration are each achieved with a wafer-level camera that is called a hybrid lens. Therefore, an aperture stop is allowed to be built in the hybrid lens, and the second lens group and the third lens group are allowed to be formed integrally. Therefore, high productivity and high reliability are achieved. By adopting a hybrid lens, the third lens group is allowed to have an incident side and an emission side that are configured of glass materials with different Abbe numbers. Therefore, various aberrations such as chromatic aberration are suppressed. The first lens group is allowed to have an extremely large thickness on the axis. Therefore, a configuration that is difficult to break even when a rock hits the lens upon in-vehicle application is achieved. The back focus is long, and therefore, assembling is easy. According to the present embodiments, compact low-cost camera that is used for applications such as in-vehicle application and monitoring application, that has high heat resistance and superior reliability, and that is favorable in terms of cost are allowed to be in mass-production.

The image pickup lenses 100 and 100A that each have features as described above are applicable to a digital camera that uses an image pickup device such as a CCD sensor and a CMOS sensor, in particular, are applicable as a lens for a camera mounted on a compact electronic apparatus such as a mobile phone.

3. Third Embodiment

Figure 7:
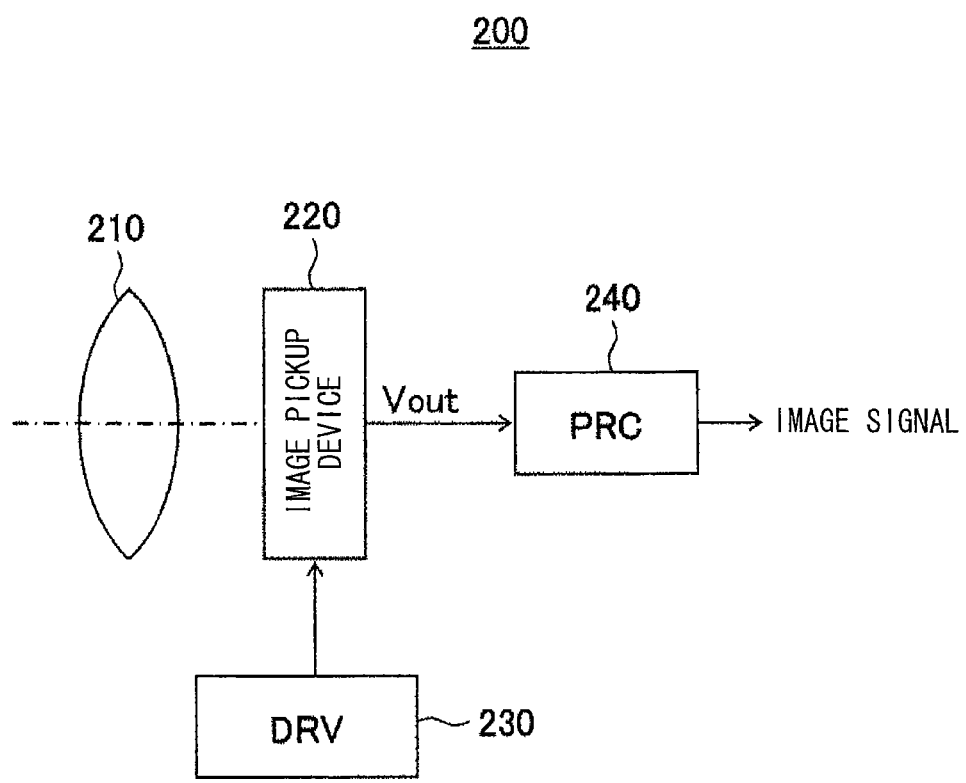
FIG. 7 is a block diagram illustrating a configuration example of an image pickup apparatus that adopts the image pickup lens of the present embodiment.

FIG. 7 is a block diagram illustrating a configuration example of an image pickup apparatus that adopts the image pickup lens including the optical unit according to any of the present embodiments.

A present image pickup apparatus 200 includes an optical system 210 to which one of the image pickup lenses 100 and 100A according to the present embodiments is applied, and an image pickup device 220 to which an image sensor (solid image pickup device) such as a CCD image sensor and a CMOS image sensor is applied. The optical system 210 guides incident light to an image pickup plane that includes a pixel region of the image pickup device 220 and forms an image of a subject. The image pickup apparatus 200 further includes a drive circuit (DRV) 230 that drives the image pickup device 220 and a signal processing circuit (PRC) 240 that processes an output signal from the image pickup device 220.

The drive circuit 230 includes a timing generator (not illustrated) that generates various timing signals including, for example, a start pulse, a clock pulse, and the like that drives a circuit in the image pickup device 220. The drive circuit 230 drives the image pickup device 220 with use of a predetermined timing signal.

Moreover, the signal processing circuit 240 performs a predetermined signal process on the output signal from the image pickup device 220. An image signal processed in the signal processing circuit 240 is recorded in a recording media such as a memory. Image information recorded in the recording media is hardcopied by, for example, a printer. Moreover, the image signal processed in the signal processing circuit 240 is displayed as a moving picture on a monitor configured of, for example, a liquid crystal display or the like.

As described above, high-definition camera with low power consumption is achieved by mounting the above-described image pickup lens 100 or 100A as the optical system 210 in an image pickup apparatus such as a digital still camera.

The invention claimed is:

1. An optical unit comprising:
    a first lens group including a first lens element;
    a second lens group including a second lens element, a first transparent member, and a third lens element that are arranged in recited order from object plane toward image plane; and
    a third lens group including a fourth lens element, a second transparent member, and a fifth lens element that are arranged in recited order from the object plane toward the image plane,
    the first, second, and third lens groups being arranged in recited order from the object plane toward the image plane,
    wherein a focal length fL1 of the first lens group and a focal length fL2 of the second lens group satisfy following conditional expressions, $-10 \leq fL1/f \leq -2$ $0.8 \leq fL2/f \leq 5$ where f is a focal length of whole of the optical unit.

2. An optical unit comprising:
    a first lens group consisting of a single first lens element being a glass spherical lens equivalent to BK7 glass and having a negative power and a concave shape facing toward an image plane;
    a second lens group including a second lens element, a first transparent member, and a third lens element that are arranged in recited order from an object plane toward the image plane; and
    a third lens group including a fourth lens element, a second transparent member, and a fifth lens element that are arranged in recited order from the object plane toward the image plane,
    the first, second, and third lens groups being arranged in recited order from the object plane toward the image plane along an optical axis.

3. The optical unit according to claim 2, wherein
    the fourth lens element in the third lens group has a plano-concave shape having a concave shape on an object plane side thereof, and
    the fifth lens element in the third lens group has a plano-convex shape having a convex shape on an image plane side thereof.

4. The optical unit according to claim 2, wherein an Abbe number vdE4 of the fourth lens element and an Abbe number vdE5 of the fifth lens element satisfy following conditional expressions, $24 \leq vdE4 \leq 45$ $42 \leq vdE5 \leq 66$.

5. The optical unit according to claim 2, wherein a number of lenses that are formed with a wafer shape are diced into pieces to form the second lens group and the third lens group.

6. The optical unit according to claim 2, wherein an angle of view satisfies following conditional expression expressed in units of degree, $65 \leq 2\omega \leq 140$ where $\omega$ is a horizontal half angle of view.

7. The optical unit according to claim 2, wherein a focal length fL1 of the first lens group and a focal length fL2 of the second lens group satisfy following conditional expressions:

$-10 \leq fL1/f \leq -2$ $0.8 \leq fL2/f \leq 5$ where f is a focal length of whole of the optical unit,
    wherein the fourth lens element in the third lens group has a plano-concave shape having a concave shape on an object plane side thereof and the fifth lens element in the third lens group has a plano-convex shape having a convex shape on an image plane side thereof,
    wherein an Abbe number vdE4 of the fourth lens element and an Abbe number vdE5 of the fifth lens element satisfy following conditional expressions:

$24 \leq vdE4 \leq 45$ $42 \leq vdE5 \leq 66$, and wherein a number of lenses that are formed with a wafer shape are diced into pieces to form the second lens group and the third lens group.

8. The optical unit according to claim 7, wherein an angle of view satisfies following conditional expression expressed in units of degree, $65 \leq 2\omega \leq 140$ where $\omega$ is a horizontal half angle of view.

9. The optical unit according to claim 2, wherein the single first lens element has an object-side face and an opposite image-side face, the object-side face and the image-side face being disposed apart from one another along the optical axis at a distance of approximately 3.0 mm.

10. An image pickup apparatus with an image pickup device and an optical unit forming an image of a subject in the image pickup device, the optical unit comprising:
   a first lens group consisting of a single first lens element being a glass spherical lens equivalent to BK7 glass and having a negative power and a concave shape facing toward an image plane;
   a second lens group including a second lens element, a first transparent member, and a third lens element that are arranged in recited order from object plane toward image plane; and
   a third lens group including a fourth lens element, a second transparent member, and a fifth lens element that are arranged in recited order from the object plane toward the image plane,
   the first, second, and third lens groups being arranged in recited order from the object plane toward the image plane along an optical axis.

11. The image pickup apparatus according to claim 10, wherein a focal length fL1 of the first lens group and a focal length fL2 of the second lens group satisfy following conditional expressions:

$-10 \leq fL1/f \leq -2$ $0.8 \leq fL2/f \leq 5$ where f is a focal length of whole of the optical unit,
   wherein the fourth lens element in the third lens group has a plano-concave shape having a concave shape on an object plane side thereof and the fifth lens element in the third lens group has a plano-convex shape having a convex shape on an image plane side thereof,
   wherein an Abbe number vdE4 of the fourth lens element and an Abbe number vdE5 of the fifth lens element satisfy following conditional expressions:

$24 \leq vdE4 \leq 45$ $42 \leq vdE5 \leq 66$, and wherein a number of lenses that are formed with a wafer shape are diced into pieces to form the second lens group and the third lens group.

12. The optical unit according to claim 11, wherein an angle of view satisfies following conditional expression expressed in units of degree, $65 \leq 2\omega \leq 140$ where $\omega$ is a horizontal half angle of view.

13. The optical unit according to claim 10, wherein the single first lens element has an object-side face and an opposite image-side face, the object-side face and the image-side face being disposed apart from one another along the optical axis at a distance of approximately 3.0 mm.

14. An image pickup apparatus with an image pickup device and an optical unit forming an image of a subject in the image pickup device, the optical unit comprising:
   a first lens group including a first lens element;
   a second lens group including a second lens element, a first transparent member, and a third lens element that are arranged in recited order from object plane toward image plane; and
   a third lens group including a fourth lens element, a second transparent member, and a fifth lens element that are arranged in recited order from the object plane toward the image plane,
   the first, second, and third lens groups being arranged in recited order from the object plane toward the image plane,
   wherein a focal length fL1 of the first lens group and a focal length fL2 of the second lens group satisfy following conditional expressions, $-10 \leq fL1/f \leq -2$ $0.8 \leq fL2/f \leq 5$ where f is a focal length of whole of the optical unit.

* * * * *